(12) United States Patent
Koike et al.

(10) Patent No.: US 12,071,131 B2
(45) Date of Patent: Aug. 27, 2024

(54) ELECTRONIC TOWING SYSTEM AND METHOD FOR CONTROLLING ROUTE PLANNING APPARATUS

(71) Applicant: HONDA MOTOR CO., LTD., Tokyo (JP)

(72) Inventors: Satoshi Koike, Wako (JP); Ryuichi Hata, Wako (JP); Naoyuki Kubo, Wako (JP); Takayuki Sakata, Wako (JP); Masayasu Yoshida, Wako (JP); Mitsuru Nonaka, Tokyo (JP); Seiichi Kato, Tokyo (JP); Masanori Yoshihira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 555 days.

(21) Appl. No.: 17/176,481

(22) Filed: Feb. 16, 2021

(65) Prior Publication Data

US 2021/0284155 A1 Sep. 16, 2021

(30) Foreign Application Priority Data

Mar. 13, 2020 (JP) .................. 2020-044373

(51) Int. Cl.
 *B60W 30/165* (2020.01)
 *G01C 21/34* (2006.01)
 *G06Q 30/0283* (2023.01)

(52) U.S. Cl.
 CPC ......... *B60W 30/165* (2013.01); *G01C 21/343* (2013.01); *G01C 21/3476* (2013.01); *G06Q 30/0283* (2013.01); *B60W 2556/65* (2020.02)

(58) Field of Classification Search
 None
 See application file for complete search history.

(56) References Cited

U.S. PATENT DOCUMENTS 10,007,271 B2 6/2018 Amla et al.
10,755,580 B2 8/2020 McQuillen et al.
(Continued)

FOREIGN PATENT DOCUMENTS

CN 104776854 A 7/2015
CN 108459601 A 8/2018
(Continued)

OTHER PUBLICATIONS

Rideshare Silver, How to Add an Extra Stop on Your Lyft Ride-Multiple Stop Feature, Jan. 7, 2018, Youtube, https://www.youtube.com/watch?v=gxT-InJdmNc (Year: 2018).*
(Continued)

*Primary Examiner* — Christian Chace
*Assistant Examiner* — Scott R Jagolinzer
(74) *Attorney, Agent, or Firm* — WHDA, LLP

(57) ABSTRACT

A route planning apparatus configured to create a travel plan that includes a planned travel route for a leading vehicle to electronically tow a following vehicle using inter-vehicle communication, the route planning apparatus comprising: a receiving unit configured to receive a request to stop at a waypoint during traveling by the electronic towing, the stop-over request being input on a second information processing apparatus that is used by an occupant of the following vehicle: a searching unit configured to search, for a waypoint according to the request, the planned travel route and a surrounding region of the planned travel route; and a transmitting unit configured to transmit information regarding a found waypoint and a route to the waypoint to a first information processing apparatus that is used by an occupant of the leading vehicle.

11 Claims, 7 Drawing Sheets

(56) References Cited

U.S. PATENT DOCUMENTS

| | | | |
|---|---|---|---|
| 10,983,531 B2 | 4/2021 | Amla et al. | |
| 11,808,588 B2* | 11/2023 | Marco | G06Q 10/025 |
| 2009/0079839 A1 | 3/2009 | Fischer et al. | |
| 2015/0323333 A1* | 11/2015 | Lord | G06Q 10/06 |
| | | | 701/117 |
| 2016/0071418 A1* | 3/2016 | Oshida | G05D 1/0295 |
| | | | 701/23 |
| 2017/0115125 A1* | 4/2017 | Outwater | H04W 4/40 |
| 2017/0168503 A1 | 6/2017 | Amla et al. | |
| 2017/0169366 A1* | 6/2017 | Klein | G06Q 10/047 |
| 2018/0081374 A1* | 3/2018 | Nimchuk | G06Q 10/02 |
| 2018/0165731 A1* | 6/2018 | Gopalakrishnan | G06Q 50/40 |
| 2018/0224852 A1 | 8/2018 | Tanahashi et al. | |
| 2018/0237012 A1 | 8/2018 | Jammoussi et al. | |
| 2018/0239362 A1 | 8/2018 | Amla et al. | |
| 2018/0314252 A1 | 11/2018 | Asakura et al. | |
| 2019/0050787 A1* | 2/2019 | Munafo | G06N 20/00 |
| 2019/0272760 A1 | 9/2019 | McQuillen et al. | |
| 2020/0004269 A1 | 1/2020 | Oba | |
| 2020/0094830 A1 | 3/2020 | Ito et al. | |
| 2021/0110434 A1* | 4/2021 | Kimura | G01C 21/3697 |
| 2021/0216082 A1 | 7/2021 | Amla et al. | |
| 2022/0219710 A1* | 7/2022 | Ghannam | B60W 50/0098 |

FOREIGN PATENT DOCUMENTS

| | | |
|---|---|---|
| CN | 108885454 A | 11/2018 |
| CN | 109937388 A | 6/2019 |
| CN | 110249374 A | 9/2019 |
| JP | 2019-1227 A | 1/2019 |

OTHER PUBLICATIONS

Office Action dated Jul. 1, 2023, issued in counterpart CN Application No. 202110216094.6, with English translation. (28 pages).

* cited by examiner

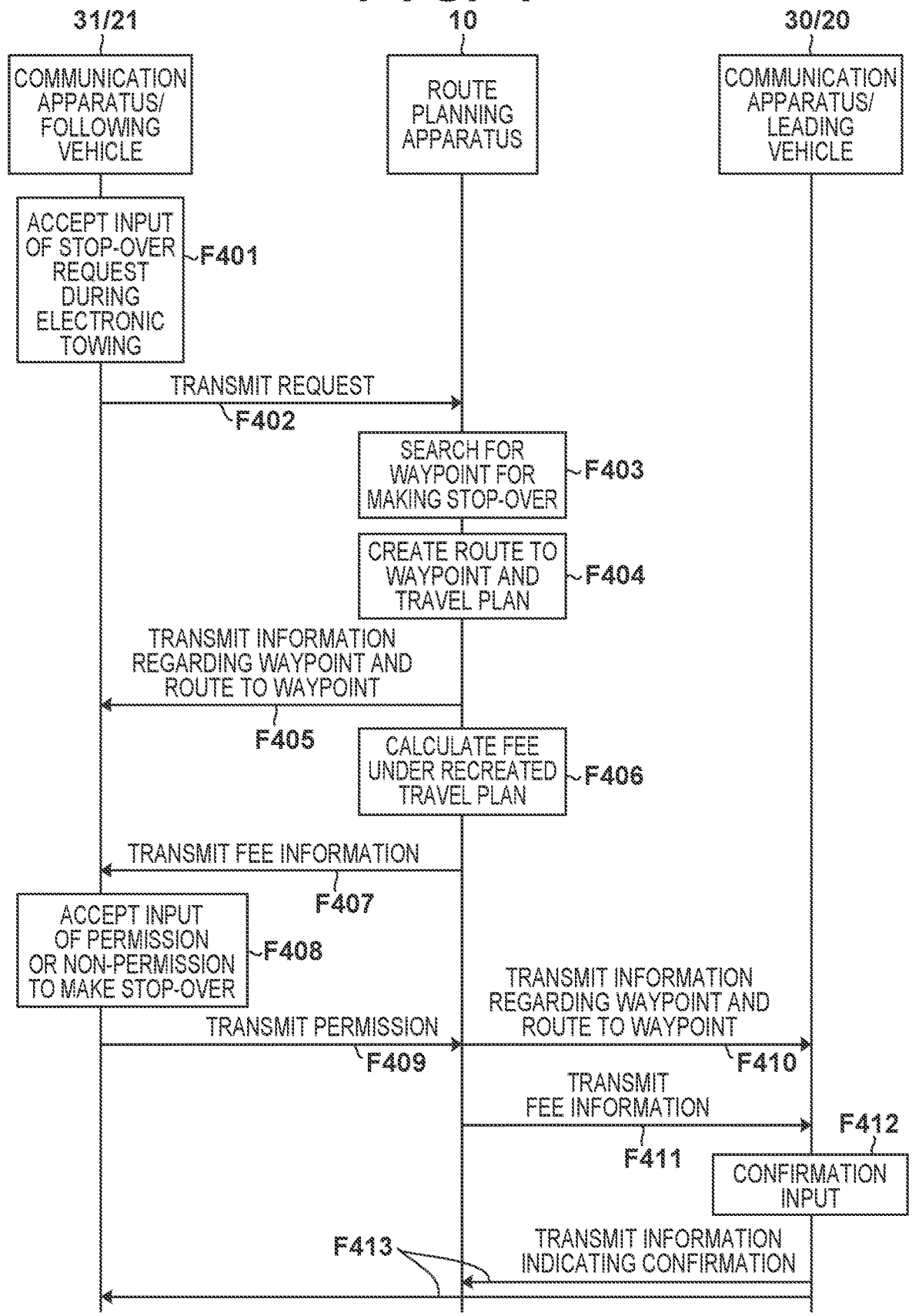

ELECTRONIC TOWING SYSTEM AND METHOD FOR CONTROLLING ROUTE PLANNING APPARATUS

CROSS-REFERENCE TO RELATED APPLICATION(S)

This application claims priority to and the benefit of Japanese Patent Application No. 2020-044373 filed on Mar. 13, 2020, the entire disclosure of which is incorporated herein by reference.

BACKGROUND OF THE INVENTION

Field of the Invention

The present invention relates to an electronic towing system and a method for controlling route planning apparatus.

Description of the Related Art

Japanese Patent Laid-Open No. 2019-1227 discloses that a leading vehicle and a following vehicle are provided with a communication function to perform electronic towing.

However, the technique disclosed in Japanese Patent Laid-Open No. 2019-1227 is problematic in that it is difficult for occupants of the following vehicle or occupants of the leading vehicle to make a stop-over (e.g., a restroom break) that is not included in the original travel plan.

The present invention has been made in view of the above-described issues, and provides a technique for an occupant of a following vehicle or a leading vehicle to easily make a stop-over that is not included in the original travel plan.

SUMMARY OF THE INVENTION

According to one aspect of the present invention, there is provided an electronic towing system in which a leading vehicle electronically tows a following vehicle using inter-vehicle communication, the electronic towing system comprising: a first information processing apparatus that is used by an occupant of the leading vehicle; a second information processing apparatus that is used by an occupant of the following vehicle; and a route planning apparatus configured to create a travel plan that includes a planned travel route in which the electronic towing is performed; wherein the second information processing apparatus includes: a memory storing a program; and one or more processors which, by executing the program, function as: an input accepting unit configured to accept an input for making a request to stop at a waypoint during traveling by the electronic towing, and a transmitting unit configured to transmit the request to the route planning apparatus, the route planning apparatus includes: a memory storing a program; and one or more processors which, by executing the program, function as: a creating unit configured to create the travel plan, a searching unit configured to search, for a waypoint according to the request, the planned travel route and a surrounding region of the planned travel route, and a transmitting unit configured to transmit information regarding a found waypoint and a route to the waypoint to the first information processing apparatus, and the first information processing apparatus includes a memory storing a program; and one or more processors which, by executing the program, function as: a notifying unit configured to notify, of the occupant of the leading vehicle, information regarding the waypoint and the route to the waypoint that has been received from the route planning apparatus.

BRIEF DESCRIPTION OF THE DRAWINGS

FIG. 4 is a diagram showing a processing sequence of an electronic towing system according to Embodiment 1.

DESCRIPTION OF THE EMBODIMENTS

Figure 1:
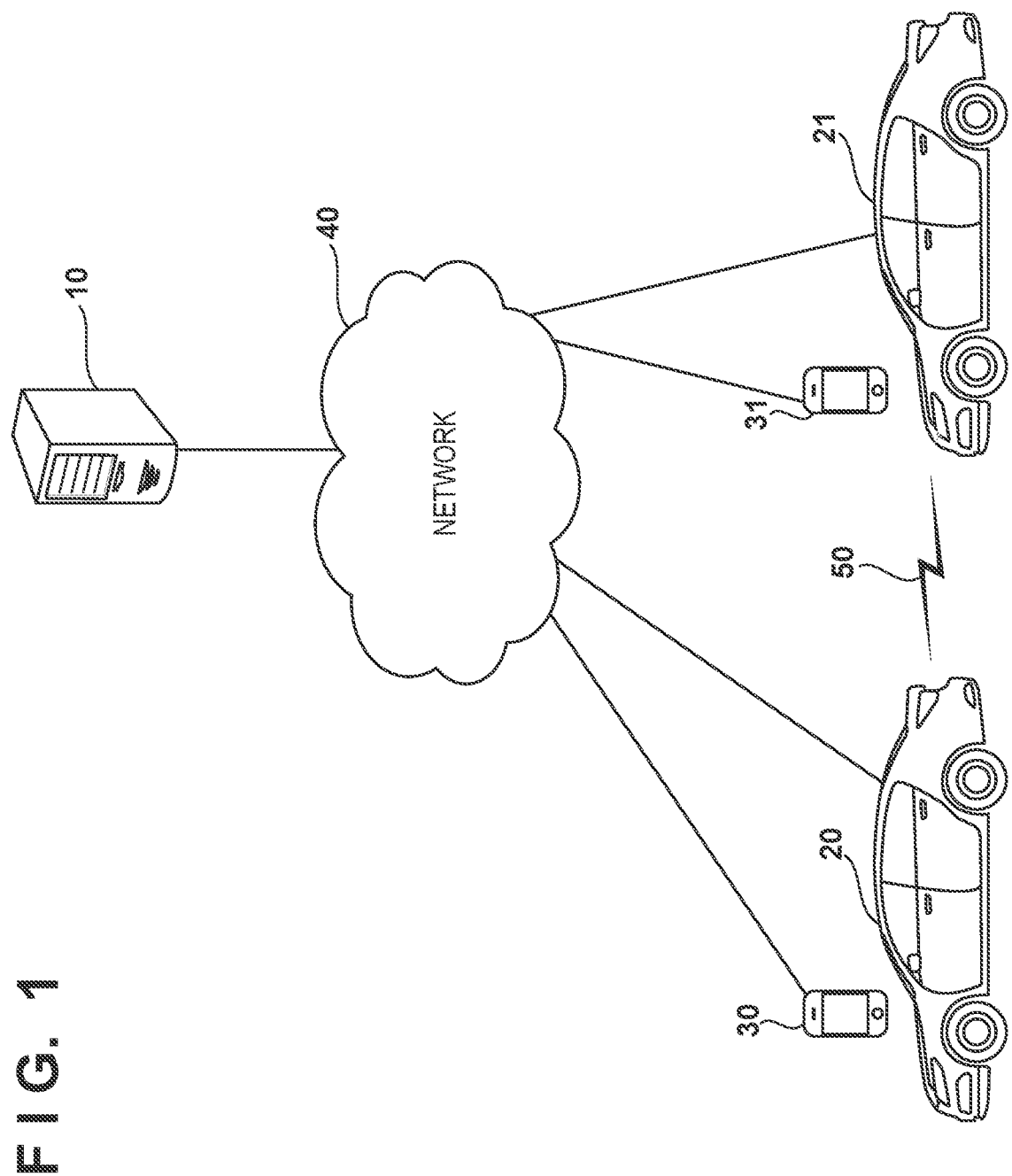
FIG. 1 is a diagram illustrating a configuration example of an electronic towing system according to one embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Embodiment 1

Configuration of Electronic Towing System

FIG. 1 is a diagram illustrating a configuration example of an electronic lowing system according to one embodiment of the present invention. The electronic towing system includes a route planning apparatus 10, a leading vehicle 20, a following vehicle 21, a communication apparatus 30 in possession of an occupant of the leading vehicle, and a communication apparatus 31 in possession of an occupant of the following vehicle, which are configured to be communicable with each other via a network 40. The network 40 is the Internet and/or a local area network (LAN), for example. Also, the leading vehicle 20 and the following vehicle 21 each have a communication function, and can perform inter-vehicle communication 50, and the leading vehicle 20 and the following vehicle 21 are electrically connected to each other using the inter-vehicle communication 50 to execute electronic towing. The following vehicle 21 automatically follows the traveling locus of the leading vehicle 20. Electronic towing is performed such that another vehicle cannot cut in between vehicles by setting the closest distance between vehicles to 1 m, for example.

Configuration of Route Planning Apparatus

Figure 2A:
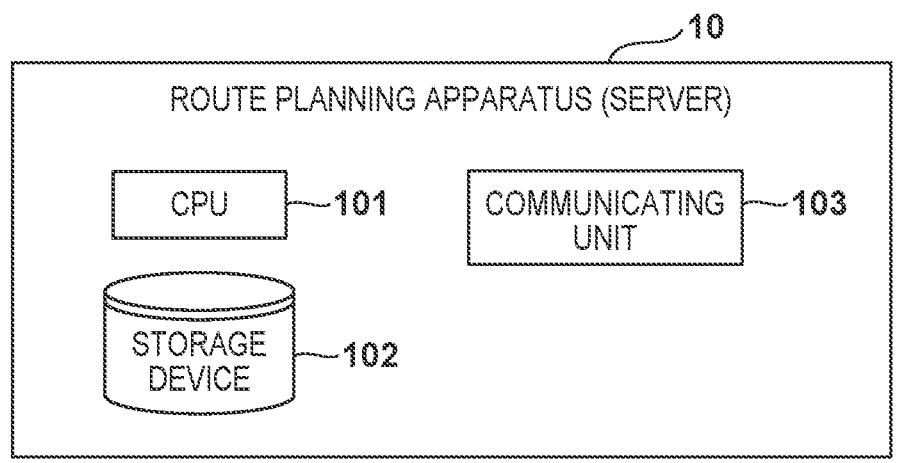
FIGS. 2A and 2B are block diagrams illustrating configuration examples of a route planning apparatus and a communication apparatus that constitute the electronic towing system according to one embodiment of the present invention.

FIG. 2A is a diagram showing a configuration example of the route planning apparatus 10 according to this embodiment. The route planning apparatus 10 functions as a server device, and is provided with a CPU 101, a storage device 102, and a communicating unit 103. The CPU 101 executes processing by reading out and executing one or more programs stored in the storage device 102. The CPU 101 can be one or more CPUs.

The storage device 102 stores various types of information. The storage device 102 can be one or more memories. The storage device 102 can store programs to be read out and executed by the CPU 101, and store information acquired from the leading vehicle 20, the following vehicle 21, and the communication apparatuses 30 and 31 through the network 40 via the communicating unit 103, and other information acquired through the network 40 via the communicating unit 103.

The route planning apparatus 10 receives information regarding a starting point (or current location) and a destination (or a waypoint), and information regarding waypoints (points where an occupant wants to take a restroom break, etc.) that are input by an occupant via the leading vehicle 20, the following vehicle 21, the communication apparatus 30, or the communication apparatus 31, and the storage device 102 stores the received information. The communicating unit 103 transmits and receives various types of information by a wire or wirelessly.

If the following vehicle 21 desires electronic towing from a starting point (or current location) to the destination, the route planning apparatus 10 creates a travel plan that includes a planned travel route. Also, if an input made by an occupant to make a request to stop at a waypoint has been accepted during electronic towing, the route planning apparatus 10 receives this request, creates a route to the waypoint according to the request, and recreates a travel plan to the destination.

Configuration of Communication Apparatus

Figure 2B:
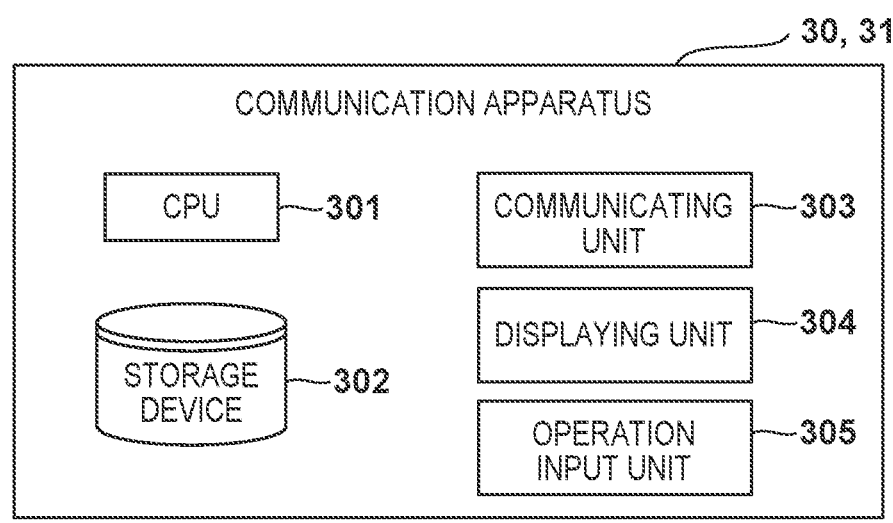

FIG. 2B is a diagram showing configuration examples of the communication apparatuses 30 and 31 according to this embodiment. The communication apparatuses 30 and 31 are communication terminals such as smartphones or the like in possession of occupants, for example.

The communication apparatuses 30 and 31 are each provided with a CPU 301, a storage device 302, a communicating unit 303, a displaying unit 304, and an operation input unit 305. The CPU 301 controls operations of the communication apparatus 30 by reading out and executing programs stored in the storage device 302. The storage device 302 stores programs to be read out and executed by the CPU 301, and stores various types of information input to the communication apparatus 30 via the operation input unit 305. The communicating unit 303 can communicate with the route planning apparatus 10 via the network 40, and transmit and receive various types of information by a wire or wirelessly. The communicating unit 203 transmits various types of information stored in the storage device 302 to the route planning apparatus 10, and receives various types of information from the route planning apparatus 10.

The displaying unit 304 is a liquid crystal display or the like, and receives the travel plan created by the route planning apparatus 10 from the route planning apparatus 10 and displays the received travel plan, and displays various screens, for example. The operation input unit 305 is a physical button, a rotation operation element, or the like, and a user (occupant) can input various types of navigation information regarding a starting point, a destination, a waypoint, and the like, and input a request to stop at the waypoint for the reason of a restroom break or the like by operating the operation input unit 305, and the accepted information is transmitted to the route planning apparatus 10. If the displaying unit 304 is a touch panel, the displaying unit 304 may also have the function of the operation input unit 305.

Configuration of Leading Vehicle

Figure 3A:
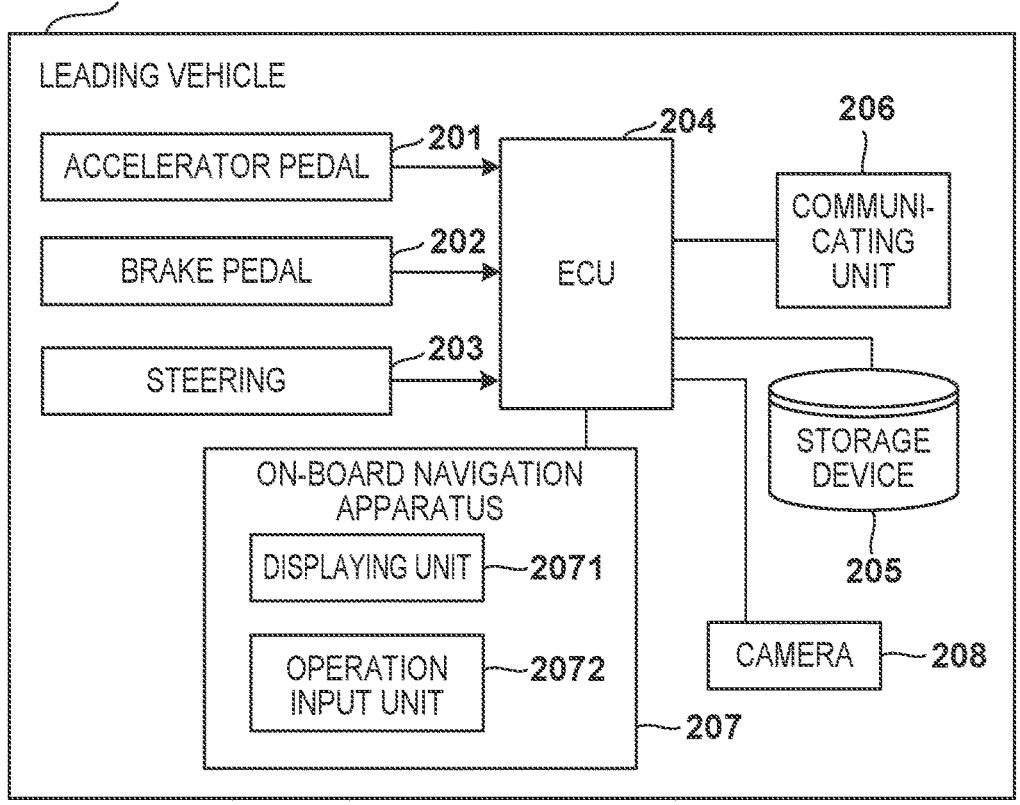
FIGS. 3A and 3B are block diagrams illustrating configuration examples of a leading vehicle and a following vehicle that constitute the electronic towing system according to one embodiment of the present invention.

FIG. 3A is a diagram showing a configuration example of the leading vehicle 20 according to this embodiment. The leading vehicle 20 is provided with an accelerator pedal 201, a brake pedal 202, a steering 203, an ECU (electronic control unit) 204, a storage device 205, a communicating unit 206, an on-board navigation apparatus 207, and a camera 208.

Information regarding the operation amounts of the accelerator pedal 201, the brake pedal 202, and the steering 203 operated by the driver of the leading vehicle 20 is transmitted to the ECU 204.

The ECU 204 controls a drive mechanism (not shown) such as an engine or a drive motor based on the operation amount of an acceleration operation element (the accelerator pedal 201) operated by the driver. Also, the ECU 204 controls a brake mechanism (not shown) based on the operation amount of a brake operation element (the brake pedal 202) operated by the driver. The brake mechanism is a disk brake provided on each wheel of the leading vehicle 20, for example. Also, the ECU 201 controls a steering mechanism (not shown) based on the operation amount of a steering operation element (the steering 203) operated by the driver. The steering mechanism is power steering. Also, the ECU 204 transmits information indicating the operation amounts of the accelerator pedal 201, the brake pedal 202, and the steering 203 to the following vehicle 21 through the inter-vehicle communication 50 via the communicating unit 206.

The storage device 205 stores information indicating the operation amounts of the accelerator pedal 201, the brake pedal 202, and the steering 203, information regarding the starting point and the destination that are input via the on-board navigation apparatus 207, information regarding a travel plan that includes the planned travel route created by the route planning apparatus 10, images captured by the camera 208, computer programs for realizing processing performed by the ECU 204, and the like.

The communicating unit 206 can transmit information indicating the operation amounts of the accelerator pedal 201, the brake pedal 202, and the steering 203 through the inter-vehicle communication 50. Also, the communicating unit 206 can communicate with the route planning apparatus 10 and the communication apparatuses 30 and 31 via the network 40, and transmit and receive various types of information.

The on-board navigation apparatus 207 is provided with a displaying unit 2071 and an operation input unit 2072. The displaying unit 2071 is a liquid crystal display or the like, and displays various types of navigation information such as information regarding a route starting from a starting point (or current location) to the destination (or a waypoint), and receives and displays the travel plan created by the route planning apparatus 10.

The operation input unit 2072 is a physical button, a rotation operation element, or the like, and a user (occupant) can input various types of navigation information such as the starting point and the destination by operating the operation input unit 2072. Note that, if the displaying unit 2071 is a touch panel, the displaying unit 2071 may also have the function of the operation input unit 2072.

The camera 208 is one or more cameras for capturing images of a surrounding region of the leading vehicle 20. Note that a radar or a LIDAR (Light Detection and Ranging) may be provided, in addition to the camera 208 or instead of the camera 208.

Configuration of Following Vehicle

Figure 3B:
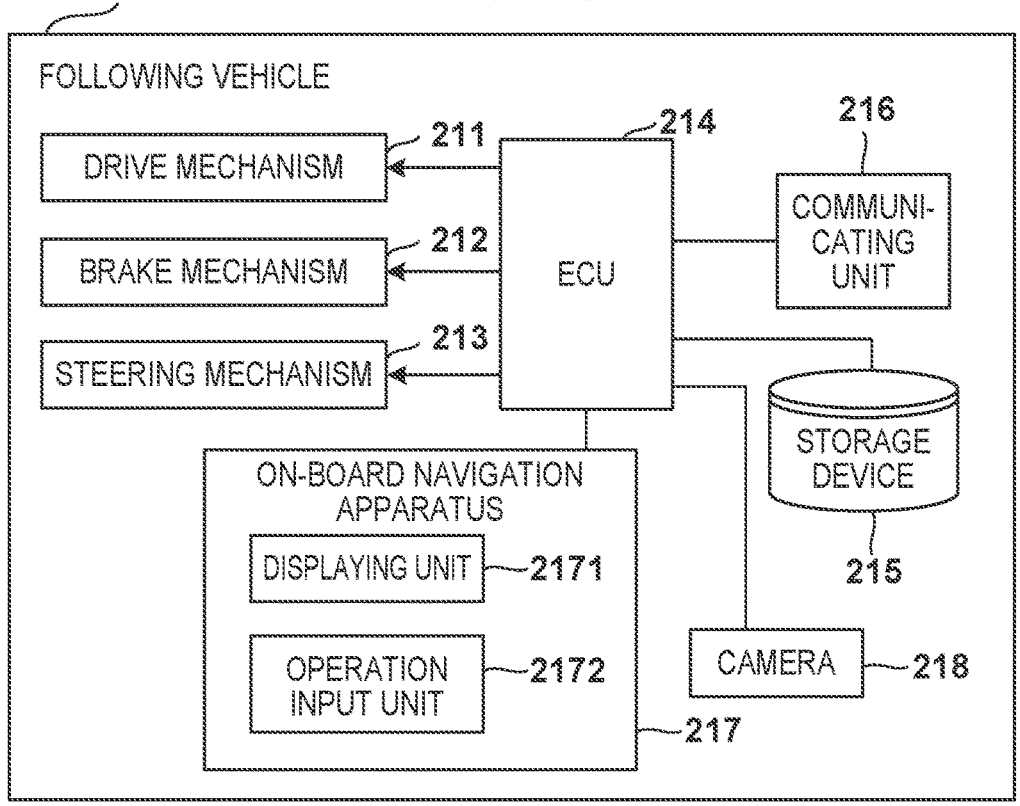

Next, FIG. 3B is a diagram showing a configuration example of the following vehicle 21 according to this embodiment. The following vehicle 21 is provided with a drive mechanism 211, a brake mechanism 212, a steering mechanism 213, an ECU (electronic control unit) 214, a storage device 215, a communicating unit 216, an on-board navigation apparatus 217, and a camera 218.

The drive mechanism 211 is an engine, a drive motor, or the like. The brake mechanism 212 is a disk brake provided on each wheel of the following vehicle 21, for example. The steering mechanism 213 is power steering, for example.

The ECU 214 generates a target locus following the travel locus of the leading vehicle 20 based on information regarding the operation amount, information regarding the speed and acceleration of the leading vehicle 20 received from the leading vehicle 20 through the inter-vehicle communication 50 via the communicating unit 216, and information regarding images captured by the camera 218 and the like. Then, automated vehicle following is executed by controlling the drive mechanism 211, the brake mechanism 212, the steering mechanism 213 so as to travel according to the generated target locus. Accordingly, electronic towing is realized.

The storage device 215 stores information regarding the starting point and the destination that are input via the on-board navigation apparatus 217, information regarding a travel plan that includes the planned travel route created by the route planning apparatus 10, images captured by the camera 218, computer programs for realizing processing performed by the ECU 214, and the like.

The communicating unit 216 can receive, from the leading vehicle 20, information indicating the operation amounts of the accelerator pedal 201, the brake pedal 202, and the steering 203 in the leading vehicle, information regarding the speed and the acceleration of the leading vehicle 20, and the like through the inter-vehicle communication 50. Also, the communicating unit 216 can communicate with the route planning apparatus 10 and the communication apparatuses 30 and 31 via the network 40, and transmit and receive various types of information.

The on-board navigation apparatus 217 is provided with a displaying unit 2171 and an operation input unit 2172. The displaying unit 2171 is a liquid crystal display or the like, and displays various types of navigation information such as information regarding a route from a starting point (or current location) to the destination (or a waypoint), and receives and displays the travel plan created by the route planning apparatus 10.

The operation input unit 2172 is a physical button, a rotation operation element, or the like, and a driver (user) can input various types of navigation information such as the starting point and the destination by operating the operation input unit 2072. Note that, if the displaying unit 2171 is a touch panel, the displaying unit 2171 may also have the function of the operation input unit 2172.

The camera 218 is one or more cameras for capturing images of a surrounding region of the following vehicle 21. Note that a radar or a LIDAR (Light Detection and Ranging) may be provided, in addition to the camera 218 or instead of the camera 218.

Note that, although an example has been described above in which a request to stop at a waypoint (a restroom break or the like) is input via the communication apparatus 30 in possession of the occupant of the leading vehicle 20, the present invention is not limited to this example. A request may be input by operating an on-board apparatus (e.g., the on-board navigation apparatus 207) of the leading vehicle 20, or various operation elements provided in the leading vehicle 20, for example.

Similarly, although an example has been described above in which a request to stop at a waypoint (a restroom break or the like) is input via the communication apparatus 31 in possession of the occupant of the following vehicle 21, the present invention is not limited to this example. A request may be input by operating an on-board apparatus (e.g., the on-board navigation apparatus 217) of the following vehicle 21, or various operation elements provided in the following vehicle 21, for example.

Processing Sequence

FIG. 4 is a sequence diagram of processing executed by apparatuses constituting the electronic towing system according to this embodiment. In F401, the input of a stop-over request for an emergency break due to a need to use a restroom, motion sickness, a low gasoline level, or the like is accepted via an information processing apparatus (e.g., the communication apparatus 31, or the on-board apparatus (e.g., the navigation apparatus 217) of the following vehicle 21) used by the occupant of the following vehicle 21 during electronic towing. At this time, the input of designating the genre of a waypoint for making a stop-over may be accepted. It is possible to designate genres such as convenience stores, filling stations, and rest areas, for example. Also, an input for designating the duration of stay (stay time) when a stop-over is made may be further accepted.

In F402, the information processing apparatus used by the occupant of the following vehicle 21 transmits the request accepted in F401 to the route planning apparatus 10.

In F403, the route planning apparatus 10 searches a planned travel route included in the current travel plan and a surrounding region of the planned travel route for a waypoint for making a stop-over in response to the request received from the information processing apparatus used by the occupant of the following vehicle 21. If a restroom break needs to be taken during electronic towing on the highway, the route planning apparatus 10 searches for the nearest rest area, for example. Also, if a restroom break needs to be taken during electronic towing on a general road, the route planning apparatus 10 searches for convenience stores, filling stations, restaurants, and other commercial facilities around the current location. Note that, if the genre of a waypoint is designated in F401, the route planning apparatus 10 searches for candidates for waypoints belonging to that genre.

In F404, the route planning apparatus 10 creates a route from the current locations of the leading vehicle 20 and the following vehicle 21 to the found waypoint, and recreates a travel plan passing through the additional waypoint. Also, if the input regarding the stay time has been accepted in F401, a travel plan may be created in consideration of this stay time. The travel time required to travel on a new planned travel route may be calculated while considering the stay time, and a new travel plan that includes the travel time and the planned travel route may be created, for example.

In F405, the route planning apparatus 10 transmits, to the information processing apparatus used by the occupant of the following vehicle 21, information regarding the found waypoint and information regarding the route from the current location to that waypoint.

In F406, the route planning apparatus 10 calculates the towing fee needed when electronic towing is executed under the recreated travel plan. If a travel plan is recreated, for example, a fee that is higher than the electronic towing fee under the original travel plan may be calculated. If there is a delay in the travel plan due to circumstances on the following vehicle 21 side that has made a request for electronic towing, the fee to be paid to the leading vehicle 20 is set higher because the delay will be a burden on the leading vehicle 20.

However, if the travel time calculated under the recreated travel plan is in a predetermined range from the travel time calculated under the travel plan before the recreation of the travel plan, the same amount of fee as that of the original travel plan may be recalculated. This is to forgo an increase in the fee as long as the originally planned time is not significantly delayed even if a stop-over is made due to the circumstances on the following vehicle 21 side.

In F407, the route planning apparatus 10 transmits information regarding the fee calculated in F406 to the information processing apparatus used by the occupant of the following vehicle 21.

In F408, the information processing apparatus used by the occupant of the following vehicle 21 displays information received from the route planning apparatus 10 in F405 and F407, and accepts an input from the occupant as to whether or not to allow a stop-over at the found waypoint. The occupant looks at the recalculated fee, the route to be changed, and the like, and inputs permission or non-permission to make the stop-over. If non-permission has been input here, a series of processes ends. On the other hand, if the permission input has been accepted, the processing proceeds to F409.

In F409, the information processing apparatus used by the occupant of the following vehicle 21 transmits information indicating that the permission has been accepted to the route planning apparatus 10.

In F410, in response to the reception of information indicating permission from the information processing apparatus used by the occupant of the following vehicle 21, the route planning apparatus 10 transmits, to the information processing apparatus (e.g., the communication apparatus 30 or the on-board apparatus (e.g., the navigation apparatus 207) of the leading vehicle 20) used by the occupant of the leading vehicle 20, information regarding the found waypoint and information regarding the route from the current location to the waypoint. Furthermore, in F411, the route planning apparatus 10 transmits information regarding the fee calculated in F406 to the information processing apparatus used by the occupant of the leading vehicle 20. Accordingly, the occupant of the leading vehicle 20 can recognize that the request to stop at the waypoint has been made, and can move to the waypoint.

In F412, the information processing apparatus used by the occupant of the leading vehicle 20 accepts a confirmation input indicating that the occupant consents to move to the waypoint based on the stop-over request. In F413, the information processing apparatus used by the occupant of the leading vehicle 20 transmits information indicating the confirmation to the route planning apparatus 10 and the information processing apparatus used by the occupant of the following vehicle 21 in response to the acceptance of the confirmation input. Note that, if no confirmation input has been made when a predetermined time has passed, the route planning apparatus 10 or the information processing apparatus used by the occupant of the following vehicle 21 may additionally transmit information for prompting a confirmation input to the information processing apparatus used by the occupant of the leading vehicle 20. As described above, the sequence shown in FIG. 4 ends.

Note that there is no limitation on a procedure of processing shown in FIG. 4, and the processes of F404 and F406 may be performed in parallel to each other, and the information in F405 and the information in F407 may be transmitted simultaneously. Also, the processes of F410 and F411 may be performed simultaneously.

Processing

Figure 5:
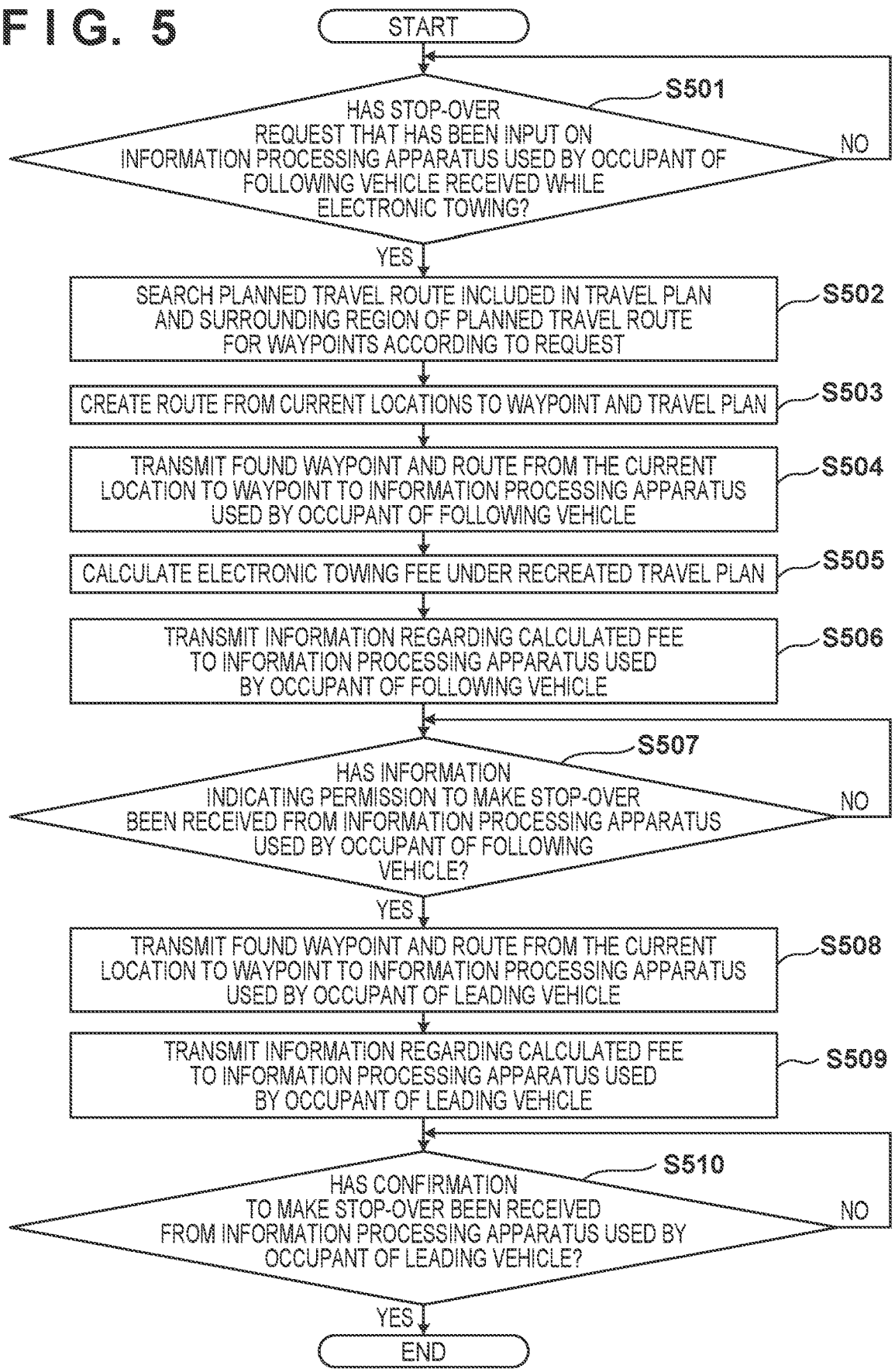
FIG. 5 is a flowchart showing a procedure of processing performed by a route planning apparatus according to Embodiment 1.

Next. FIG. 5 is a flowchart showing a procedure of processing performed by the route planning apparatus 10 according to this embodiment. The processing shown in FIG. 5 is processing performed by the route planning apparatus 10 in the sequence diagram shown in FIG. 4. This processing is performed due to the CPU 101 of the route planning apparatus 10 reading out and executing programs stored in the storage device 102.

In step S501, the CPU 101 determines whether or not a stop-over request that has been input on the information processing apparatus used by the occupant of the following vehicle 21 has been received from the information processing apparatus used by the occupant of the following vehicle 21 while the leading vehicle 20 electronically tows the following vehicle 21. If the stop-over request has been received, processing proceeds to step S502. On the other hand, if the stop-over request has not been received, the CPU 101 waits until the stop-over request is received.

In step S502, the CPU 101 searches, for waypoints according to the stop-over request, the planned travel route included in the travel plan pre-created before electronic towing is started and the surrounding region of the planned travel route.

In step S503, the CPU 101 creates the route from the current locations of the leading vehicle 20 and the following vehicle 21 to the found waypoint and a travel plan. The travel plan here refers to a new travel plan including a planned travel route to the destination after stopping at the waypoint on the planned travel route included in the original travel plan. Note that, if a plurality of waypoints are found in step S502, the processing of the stop-over regarding each waypoint may be executed.

In step S504, the CPU 101 transmits, to the information processing apparatus used by the occupant of the following vehicle 21, information regarding the found waypoint and information regarding the route from the current location to the waypoint. Furthermore, the newly created travel plan may also be transmitted together therewith.

In step S505, if electronic towing has been executed under the recreated new travel plan, the CPU 101 calculates the fee that is to be paid by the occupant of the following vehicle 21 to the leading vehicle 20. A fee that is higher than the electronic towing fee under the original travel plan may be calculated, for example. If there is a delay in the travel plan due to circumstances on the following vehicle 21 side that has made a request for electronic towing, the fee to be paid to the leading vehicle 20 is set higher because the delay will be a burden on the leading vehicle 20. However, if the travel time calculated under the recreated travel plan is in a predetermined range from the travel time calculated under a travel plan before the recreation of the travel plan, the same amount of fee as that of the original travel plan may be recalculated. This is to forgo an increase in the fee as long as the originally planned time is not significantly delayed even if a stop-over is made due to the circumstances on the following vehicle 21 side.

In step S506, the CPU 101 transmits information regarding the calculated fee to the information processing apparatus used by the occupant of the following vehicle 21.

In step S507, the CPU 101 determines whether or not information indicating permission to make a stop-over has been received from the information processing apparatus used by the occupant of the following vehicle 21. If the occupant of the following vehicle 21 looks at the calculated fee and wants to cancel a stop-over, the input of designating the cancelation is made. On the other hand, if making of a stop-over is approved, information indicating permission is transmitted to the route planning apparatus 10. If information indicating permission has been received, processing proceeds to step S508. On the other hand, if information indicating permission has not been received, the CPU 101 waits until the information is received. Also, if information indicating permission has not be received even when a predetermined time has passed, or if the input of refusing to make a stop-over has been accepted in order to cancel the stop-over and this information has been received, a series of processes ends.

In step S508, the CPU 101 transmits, to the information processing apparatus used by the occupant of the leading vehicle 20, the found waypoint and the route from the current location to the waypoint. Because a stop-over is to be made and it is necessary to notify the occupant of the leading vehicle 20 to make the stop-over, the stop-over is performed.

In step S509, the CPU 101 transmits information regarding the calculated fee to the information processing apparatus used by the occupant of the leading vehicle 20. Accordingly, it is possible to easily recognize whether or not the fee changes due to a stop-over being made, or whether the fee is increased.

In step S510, the CPU 101 determines whether or not information indicating that it has been confirmed that a stop-over is to be made has been received from the information processing apparatus used by the occupant of the leading vehicle 20. If the confirmation has been received, a series of processes ends. On the other hand, if the confirmation has not been received, the CPU 101 waits until the confirmation is received. However, if the confirmation has not been received even when a predetermined time has passed, the route planning apparatus 10 may additionally transmit information for prompting a confirmation input to the information processing apparatus used by the occupant of the leading vehicle 20. Thereafter, if the confirmation is not received, making of a stop-over may be canceled, and information indicating the cancellation may be transmitted to the information processing apparatus used by the occupant of the following vehicle 21, and/or the information processing apparatus used by the occupant of the leading vehicle 20.

As described above, in this embodiment, if a following vehicle has made a request to stop at a waypoint (e.g., an emergency break such as a restroom break) while the leading vehicle electronically tows the following vehicle, the route planning apparatus 10 searches for waypoints, and transmits, to the following vehicle side, information regarding waypoints, the routes to the waypoints, fees expected if a stop-over is made, and the like. Then, the occupant of the following vehicle looks at the received information regarding a stop-over and determines whether to make a stop-over. If a stop-over is to be made, the occupant of the leading vehicle is notified of this, and a request to stop at the found waypoint is transmitted to the leading vehicle.

Accordingly, the occupant of the following vehicle can easily make a stop-over that is not included in the original travel plan while the leading vehicle electronically tows the following vehicle.

Embodiment 2

An example is described in Embodiment 1 in which a stop-over is made in response to a request made by the occupant on the following vehicle side. In contrast, an example will be described in this embodiment in which a stop-over is made in response to a request made by the occupant on the leading vehicle side. The system configuration and device configuration are the same as those of Embodiment 1, and thus will not be described.

Processing Sequence

Figure 6:
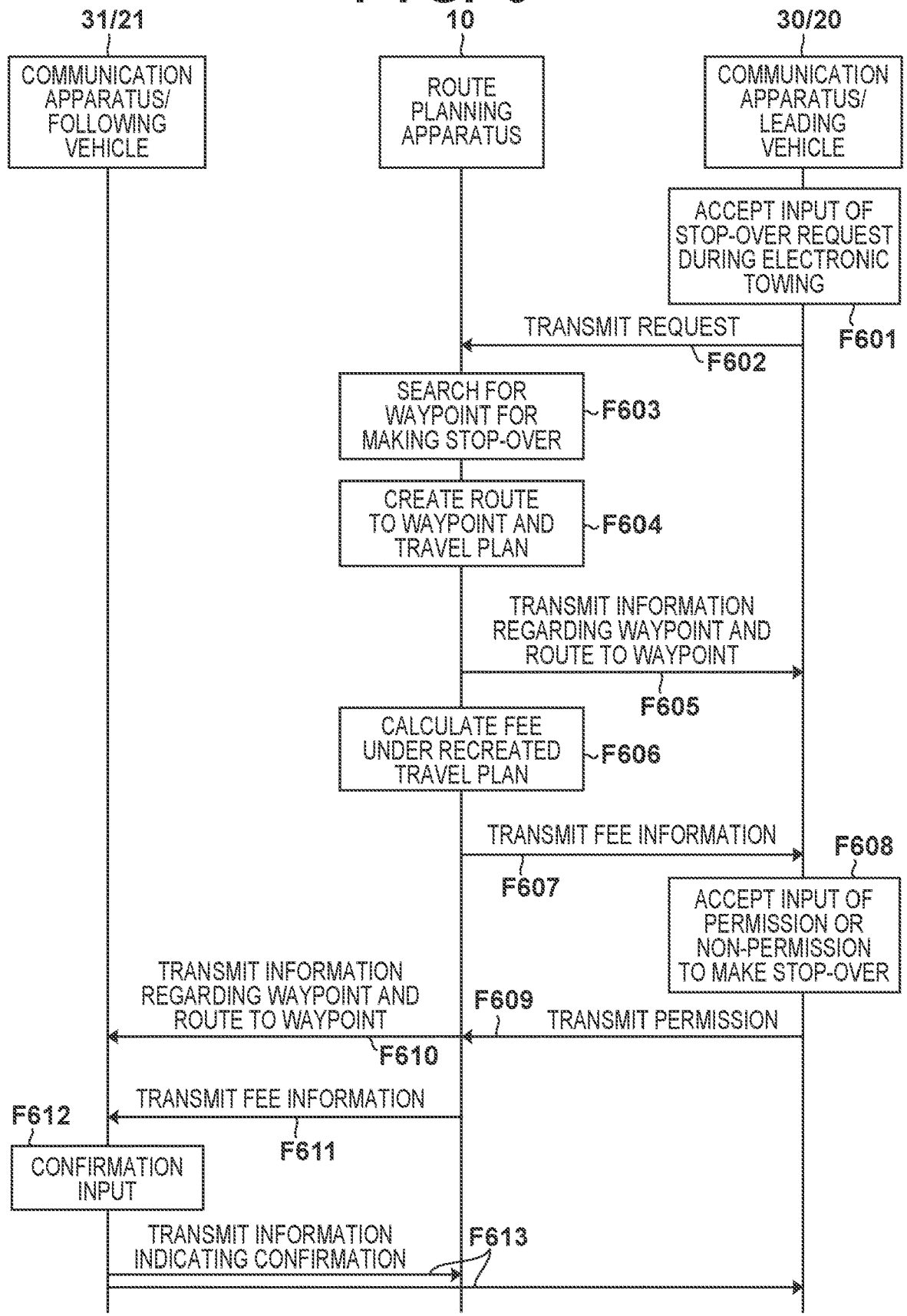
FIG. 6 is a diagram showing a processing sequence of an electronic towing system according to Embodiment 2.

FIG. 6 is a sequence diagram of processing executed by apparatuses constituting an electronic towing system according to this embodiment. Although this sequence includes processes that are substantially the same as those of the sequence shown in FIG. 4, the leading vehicle side inputs a stop-over request to take an emergency break such as a restroom break.

In F601, the input of the stop-over request for an emergency break due to a need to use a restroom, motion sickness, a low gasoline level, or the like is accepted via an information processing apparatus (e.g., the communication apparatus 30, or the on-board apparatus (e.g., the navigation apparatus 207) of the leading vehicle 20) used by the occupant of the leading vehicle 20 during electronic towing. At this time, the input of designating the genre of a waypoint for making a stop-over may be accepted. It is possible to designate genres such as convenience stores, filling stations, and rest areas, for example. Also, an input for designating the duration of stay when a stop-over is made may be further accepted.

In F602, the information processing apparatus used by the occupant of the leading vehicle 20 transmits the request accepted in F601 to the route planning apparatus 10.

In F603, the route planning apparatus 10 searches, for a waypoint for making a stop-over, a planned travel route included in the current travel plan and a surrounding region of the planned travel route in response to the request received from the information processing apparatus used by the occupant of the leading vehicle 20. If a restroom break needs to be taken during electronic towing on the highway, the route planning apparatus 10 searches for the nearest rest area, for example. Also, if a restroom break needs to be taken during electronic towing on a general road, the route planning apparatus 10 searches for convenience stores, filling stations, restaurants, and other commercial facilities around the current location. Note that, if the genre of a waypoint is designated in F601, the route planning apparatus 10 searches for candidates for waypoints belonging to that genre.

In F604, the route planning apparatus 10 creates a route from the current locations of the leading vehicle 20 and the following vehicle 21 to the found waypoint, and recreates a travel plan passing through the additional waypoint. Also, if the input regarding the stay time has been accepted in F601, a travel plan may be created in consideration of this stay time. The travel time required to travel on a new planned travel route may be calculated while considering the stay time, and a new travel plan that includes the travel time and the planned travel route may be created, for example.

In F605, the route planning apparatus 10 transmits, to the information processing apparatus used by the occupant of the leading vehicle 20, information regarding the found waypoint and information regarding the route from the current location to that waypoint.

In F606, the route planning apparatus 10 calculates the towing fee needed when electronic towing is executed under the recreated travel plan. In contrast to the example shown in FIG. 4, if a travel plan is recreated, for example, a fee that is lower that the electronic towing fee under the original travel plan may be calculated. If there is a delay in the travel plan due to circumstances on the leading vehicle 20 side that has been made a request for electronic towing, an inconvenience may be given to the following vehicle 21 requesting electronic towing. That is, the fee to be paid to the leading vehicle 20 is set lower because the delay will be a burden on the following vehicle 21.

However, if the travel time calculated under the recreated travel plan is in a predetermined range from the travel time calculated under a travel plan before the recreation of the travel plan, the same amount of fee as that of the original travel plan may be recalculated. This is to forgo a reduction in the fee (discount) as long as the originally planned time is not significantly delayed even if a stop-over is made due to the circumstances on the leading vehicle 20 side.

In F607, the route planning apparatus 10 transmits information regarding the fee calculated in F606 to the information processing apparatus used by the occupant of the leading vehicle 20.

In F608, the information processing apparatus used by the occupant of the leading vehicle 20 displays information received from the route planning apparatus 10 in F605 and F607, and accepts an input from the occupant as to whether or not to allow a stop-over at the found waypoint. The occupant looks at the recalculated fee, the route to be changed, and the like, and inputs permission or non-permission to make the stop-over. It is conceivable that the occupant of the leading vehicle 20 wants to see how much the fee is to be reduced and to cancel a stop-over depending on the results thereof, for example. That is, the permission or non-permission input is accepted because it is assumed that the income to be obtained originally will decrease significantly and the occupant wants to endure the restroom break and continue electronic towing directly to the destination. If non-permission has been input here, a series of processes ends. On the other hand, if the permission input has been accepted, the processing proceeds to F609.

In F609, the information processing apparatus used by the occupant of the leading vehicle 20 transmits information indicating that the permission has been accepted to the route planning apparatus 10.

In F610, in response to the reception of information indicating the permission from the information processing apparatus used by the occupant of the leading vehicle 20, the route planning apparatus 10 transmits, to the information processing apparatus (e.g., the communication apparatus 31 or the on-board apparatus (e.g., the navigation apparatus 217) of the following vehicle 21) used by the occupant of the following vehicle 21, information regarding the found waypoint and information regarding the route from the current location to the waypoint. Furthermore, in F611, the route planning apparatus 10 transmits information regarding the fee calculated in F606 to the information processing apparatus used by the occupant of the following vehicle 21. Accordingly, the occupant of the following vehicle 21 can recognize that the request to stop at the waypoint has been made, and thus it is possible to reduce anxiety when a stop-over that is not included in the original travel plan is made.

In F612, the information processing apparatus used by the occupant of the following vehicle 21 accepts a confirmation input indicating that the occupant consents to move to the waypoint based on the stop-over request. In F613, the information processing apparatus used by the occupant of the following vehicle 21 transmits information indicating the confirmation to the route planning apparatus 10 and the information processing apparatus used by the occupant of the leading vehicle 20 in response to the acceptance of the confirmation input. Note that, if no confirmation input has been made when a predetermined time has passed, the route planning apparatus 10 or the information processing apparatus used by the occupant of the leading vehicle 20 may additionally transmit information for prompting a confirmation input to the information processing apparatus used by the occupant of the leading vehicle 20. As described above, the sequence shown in FIG. 6 ends.

Note that there is no limitation on a procedure of processing shown in FIG. 6, and the processes of F604 and F606 may be performed in parallel to each other, and the information in F605 and the information in F607 may be transmitted simultaneously. Also, the processes of F610 and F611 may be performed simultaneously.

Processing

Figure 7:
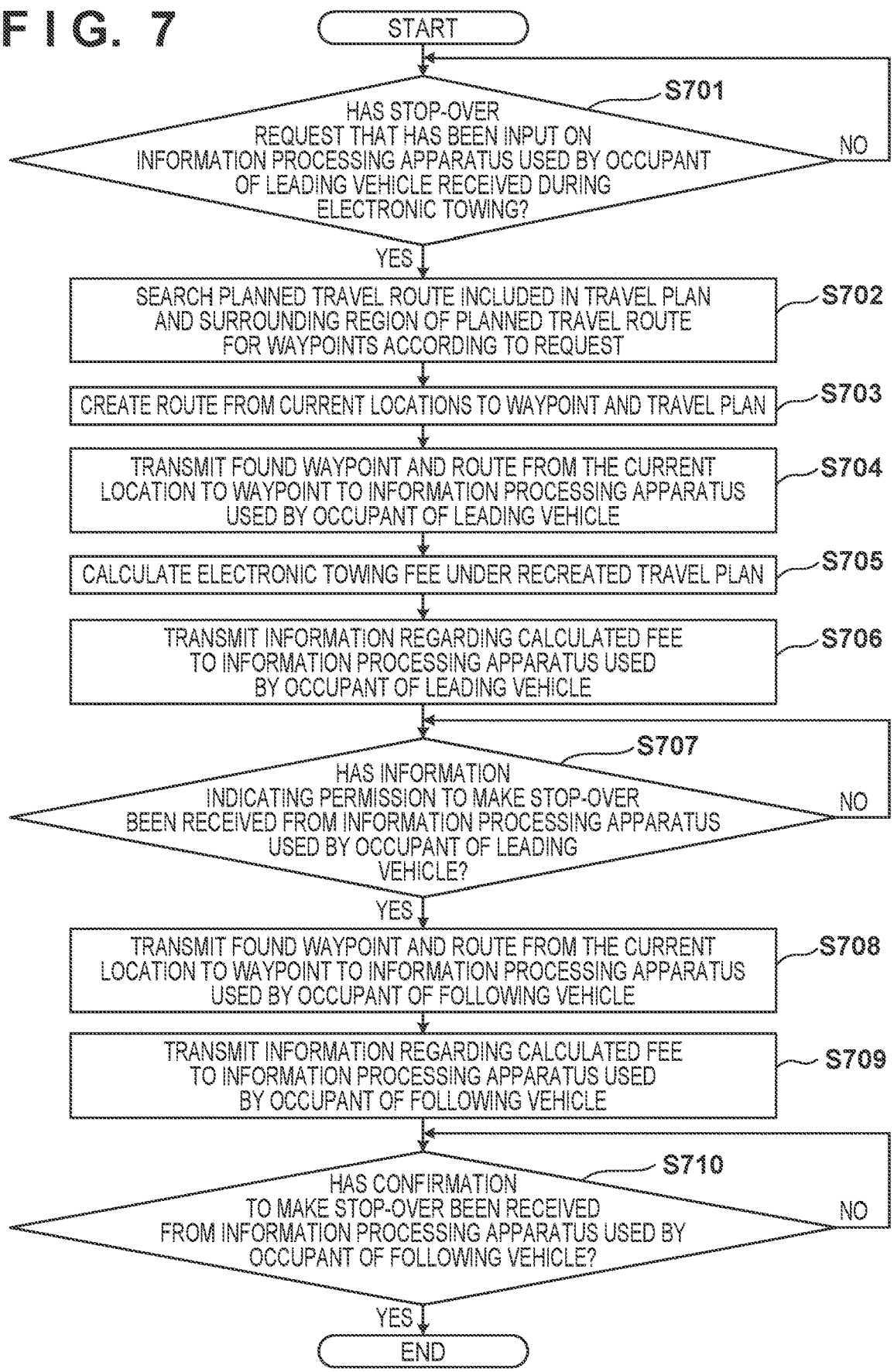
FIG. 7 is a flowchart showing a procedure of processing performed by a route planning apparatus according to Embodiment 2.

Next, FIG. 7 is a flowchart showing a procedure of processing performed by the route planning apparatus 10 according to this embodiment. The processing shown in FIG. 7 is processing performed by the route planning apparatus 10 in the sequence diagram shown in FIG. 6. This processing is performed due to the CPU 101 of the route planning apparatus 10 reading out and executing programs stored in the storage device 102.

In step S701, the CPU 101 determines whether or not a stop-over request that has been input on the information processing apparatus used by the occupant of the leading vehicle 20 has been received from the information processing apparatus used by the occupant of the leading vehicle 20 while the leading vehicle 20 electronically tows the following vehicle 21. If the stop-over request has been received, processing proceeds to step S702. On the other hand, if the stop-over request has not been received, the CPU 101 waits until the stop-over request is received.

In step S702, the CPU 101 searches, for waypoints according to the stop-over request, the planned travel route included in the travel plan pre-created before electronic towing is started and the surrounding region of the planned travel route.

In step S703, the CPU 101 creates the route from the current locations of the leading vehicle 20 and the following vehicle 21 to the found waypoint and a travel plan. The travel plan here refers to a new travel plan including a planned travel route to the destination after stopping at the waypoint on the planned travel route included in the original travel plan. Note that, if a plurality of the waypoints are found in step S702, the processing of the stop-over regarding each waypoint may be executed.

In step S704, the CPU 101 transmits, to the information processing apparatus used by the occupant of the leading vehicle 20, information regarding the found waypoint and information regarding the route from the current location to the waypoint. Furthermore, the newly created travel plan may also be transmitted together therewith.

In step S705, if electronic towing has been executed under the recreated new travel plan, the CPU 101 calculates the fee that is to be paid by the occupant of the following vehicle 21 to the leading vehicle 20. In contrast to the example shown in FIG. 5, a fee that is lower that the electronic towing fee under the original travel plan may be calculated, for example. If there is a delay in the travel plan due to circumstances on the leading vehicle 20 side, the fee to be paid to the leading vehicle 20 is set lower because the delay will be a burden on the following vehicle 21. However, if the travel time calculated under the recreated travel plan is in a predetermined range from the travel time calculated under a travel plan before the recreation of the travel plan, the same amount of fee as that of the original travel plan may be recalculated. This is to forgo a reduction in the fee as long as the originally planned time is not significantly delayed even if a stop-over is made due to the circumstances on the leading vehicle 20 side.

In step S706, the CPU 101 transmits information regarding the calculated fee to the information processing apparatus used by the occupant of the leading vehicle 20.

In step S707, the CPU 101 determines whether or not information indicating the permission to make a stop-over has been received from the information processing apparatus used by the occupant of the leading vehicle 20. If the occupant of the leading vehicle 20 looks at the calculated fee and wants to cancel a stop-over, the input of designating cancelation is made. On the other hand, if making of a stop-over is approved, information indicating the permission is transmitted to the route planning apparatus 10. If information indicating the permission has been received, processing proceeds to step S708. On the other hand, if information indicating the permission has not been received, the CPU 101 waits until the information is received. Also, if information indicating permission has not be received even when a predetermined time has passed, or if the input of refusing to make a stop-over has been accepted in order to cancel the stop-over and this information has been received, a series of processes ends.

In step S708, the CPU 101 transmits, to the information processing apparatus used by the occupant of the following vehicle 21, the found waypoint and the route from the current location to the waypoint. Because a stop-over is to be made and it is necessary to notify the occupant of the following vehicle 21 to make the stop-over, the stop-over is performed.

In step S709, the CPU 101 transmits information regarding the calculated fee to the information processing apparatus used by the occupant of the following vehicle 21. Accordingly, it is possible to easily recognize whether or not the fee changes due to a stop-over being made, or that the fee is reduced.

In step S710, the CPU 101 determines whether or not information indicating that it has been confirmed that a stop-over is to be made has been received from the information processing apparatus used by the occupant of the following vehicle 21. If the confirmation has been received, a series of processes ends. On the other hand, if the confirmation has not been received, the CPU 101 waits until the confirmation is received. However, if the confirmation has not been received even when a predetermined time has passed, the route planning apparatus 10 may additionally transmit information for prompting a confirmation input to the information processing apparatus used by the occupant of the following vehicle 21. Thereafter, if the confirmation is not received, making of a stop-over may be canceled, and information indicating the cancellation may be transmitted to the information processing apparatus used by the occupant of the leading vehicle 20, and/or the information processing apparatus used by the occupant of the following vehicle 21.

As described above, in this embodiment, if a leading vehicle has made a request to stop at a waypoint (e.g., an emergency break such as a restroom break) while the leading vehicle electronically tows the following vehicle, the route planning apparatus 10 searches for waypoints, and transmits, to the leading vehicle side, information regarding waypoints, the routes to the waypoints, fees expected if a stop-over is made, and the like. Then, the occupant of the leading vehicle looks at the received information regarding a stop-over and determines whether to make a stop-over. If a stop-over is to be made, the occupant of the following vehicle is notified of this, and the occupant of the leading vehicle stops at the found waypoint.

Accordingly, the occupant of the leading vehicle can easily make a stop-over that is not included in the original travel plan while the leading vehicle electronically tows the following vehicle.

Variations

If a plurality of candidates for waypoints for making a stop-over are found by the route planning apparatus 10, a waypoint with the shortest distance, or a waypoint where it takes the shortest time to reach may be preferentially extracted, and information regarding that waypoint may be transmitted.

Also, regardless of whether a stop-over request is made by the leading vehicle side or the following vehicle side, information indicating the reason of the stop-over (e.g., a restroom break, a motion sickness break, or a gas refueling break) may also be transmitted to the counterpart vehicle together therewith. Accordingly, the counterpart vehicle side can easily recognize the reason of the stop-over, and thus it is possible to reduce anxiety when a stop-over that is not included in the original travel plan is made.

Also, in F408 shown in FIGS. 4 and F608 shown in FIG. 6, an example has been described in which, as a result of making a stop-over request, whether or not to actually stop at the found waypoint is confirmed, but this confirmation does not have to be performed. In such a case, without confirmation, information regarding the waypoint calculated by the route planning apparatus 10, and information regarding the route to the waypoint may be transmitted to the counterpart apparatus (the information processing apparatus on the following vehicle side in the case of a stop-over request issued by the leading vehicle side, and the information processing apparatus on the leading vehicle side in the case of a stop-over request issued by the following vehicle side). At this time, if a fee has been recalculated, information regarding the recalculated fee may also be transmitted together therewith. The counterpart side can recognize that a stop-over is to be made. Also, if a fee is recalculated, a new fee can be recognized.

According to the present invention, an occupant of the following vehicle and an occupant of the leading vehicle can easily make a stop-over that is not included in the original travel plan while the leading vehicle electronically tows the following vehicle.

The invention is not limited to the foregoing embodiments, and various variations/changes are possible within the spirit of the invention.

Summary of Embodiments

An electronic towing system according to a first aspect is an electronic towing system in which a leading vehicle (e.g., 20) electronically tows a following vehicle (e.g., 21) using inter-vehicle communication (e.g., 50), the electronic towing system including:

a first information processing apparatus (e.g., 30, 207) that is used by an occupant of the leading vehicle;

a second information processing apparatus (e.g., 31, 217) that is used by an occupant of the following vehicle; and a route planning apparatus (e.g., 10) configured to create a travel plan that includes a planned travel route in which the electronic towing is performed;

in which the second information processing apparatus includes:

an input accepting unit (e.g., 301, 305, 214, and 2172) configured to accept an input for making a request to stop at a waypoint during traveling by the electronic towing, and a transmitting unit (e.g., 301, 303, 214, 216) configured to transmit the request to the route planning apparatus, the route planning apparatus includes:

a creating unit (e.g., 101) configured to create the travel plan, a searching unit (e.g., 101) configured to search, for a waypoint according to the request, the planned travel route and a surrounding region of the planned travel route, and a transmitting unit (e.g., 101, 103) configured to transmit information regarding a found waypoint and a route to the waypoint to the first information processing apparatus, and the first information processing apparatus includes:

a notifying unit (e.g., 301, 303, 204, 206) configured to notify, of the occupant of the leading vehicle, information regarding the waypoint and the route to the waypoint that has been received from the route planning apparatus.

Accordingly, the occupant of the following vehicle can easily make a stop-over that is not included in the original travel plan while the leading vehicle electronically tows the following vehicle.

In an electronic towing system according to a second aspect, the input accepting unit is capable of accepting an input for designating a genre of the waypoint, and the searching unit is configured to search for a waypoint belonging to the genre.

Accordingly, the occupant can stop at a desired waypoint.

In an electronic towing system according to a third aspect, the input accepting unit is capable of further accepting an input for designating a stay time at the waypoint, and the creating unit is configured to recreate the travel plan based on the information regarding the waypoint and the route to the waypoint and information regarding the stay time.

Accordingly, it is possible to create a travel plan in consideration of the stay time. Thus, it is also possible to calculate how long it will take to reach the destination if electronic towing is performed under a new travel plan.

In an electronic towing system according to a fourth aspect, the route planning apparatus further includes:

a calculating unit (e.g., 101) configured to calculate a fee to be paid by the occupant of the following vehicle for the electronic towing according to the travel plan, and if the travel plan has been recreated by the creating unit, the calculating unit recalculates the fee.

Accordingly, it is possible to calculate a more appropriate fee in consideration of a stop-over that is not originally planned.

In an electronic towing system according to a fifth aspect, if the travel plan has been recreated by the creating unit, the calculating unit calculates a fee that is higher than a fee of an original travel plan.

Accordingly, it is possible to set a fair fee by increasing the electronic towing fee paid by the following vehicle side to the leading vehicle side because a burden on the leading vehicle increases when the following vehicle side desires to make a stop-over.

In an electronic towing system according to a sixth aspect, if the travel plan has been recreated by the creating unit and a travel time obtained after the recreation of the travel plan is in a predetermined range from a travel time obtained before the recreation of the travel plan, the calculating unit recalculates the same amount of fee as that of the original travel plan.

Accordingly, even if a stop-over is made due to the circumstances on the following vehicle side, if a time burden on the leading vehicle does not significantly change, it is possible to accept the original amount of fee without increasing the fee.

In an electronic towing system according to a seventh aspect, the transmitting unit of the route planning apparatus is configured to transmit information regarding the found waypoint and the route to the waypoint to the second information processing apparatus (e.g., F405), and the input accepting unit of the second information processing apparatus is configured to further accept an input of permission or non-permission to make a stop-over, for the information regarding the found waypoint and the route to the waypoint that has been received from the route planning apparatus (e.g., F408).

Accordingly, an occupant on the following vehicle side can determine whether or not to actually make a stop-over even though the occupant has made a stop-over request, after checking information regarding the found waypoint.

In an electronic towing system according to an eighth aspect, the transmitting unit of the second information processing apparatus is configured to further transmit information indicating the permission or the non-permission to the route planning apparatus (e.g., F409), and if the information indicating the permission or the non-permission is permission, the transmitting unit of the route planning apparatus transmits the information regarding the found waypoint and the route to the waypoint to the first information processing apparatus (e.g., F410).

Accordingly, only when it is determined that a stop at a waypoint is actually made for the first time based on the stop-over request made by the occupant on the following vehicle side, an occupant on the leading vehicle side can recognize information regarding the stop-over. Although, if the leading vehicle is notified of information regarding a stop-over before it is determined that the stop-over is made, confusion may occur if cancelation is made formally after the determination, it is possible to prevent such a situation before it occurs.

An electronic towing system according to a ninth aspect is an electronic towing system in which a leading vehicle (e.g., 20) electronically tows a following vehicle (e.g., 21) using inter-vehicle communication (e.g., 50), the electronic towing system including:

a first information processing apparatus (e.g., 30, 207) that is used by an occupant of the leading vehicle;

a second information processing apparatus (e.g., 31, 217) that is used by an occupant of the following vehicle; and a route planning apparatus (e.g., 10) configured to create a travel plan that includes a planned travel route in which the electronic towing is performed;

in which the first information processing apparatus includes:

an input accepting unit (e.g., 301, 305, 204, and 2072) configured to accept an input for making a request to stop at a waypoint during traveling by the electronic towing, and a transmitting unit (e.g., 301, 303, 204, 206) configured to transmit the request to the route planning apparatus, the route planning apparatus includes:

a creating unit (e.g., 101) configured to create the travel plan, a searching unit (e.g., 101) configured to search, for a waypoint according to the request, the planned travel route and a surrounding region of the planned travel route, and a transmitting unit (e.g., 101, 103) configured to transmit information regarding a found waypoint and a route to the waypoint to the second information processing apparatus, and the second information processing apparatus includes:

a notifying unit (e.g., 301, 303, 214, 216) configured to notify, of the occupant of the following vehicle, information regarding the waypoint and the route to the waypoint that has been received from the route planning apparatus.

Accordingly, the occupant of the leading vehicle can easily make a stop-over that is not included in the original travel plan while the leading vehicle electronically tows the following vehicle.

In an electronic towing system according to a tenth aspect, the route planning apparatus further includes:

a calculating unit (e.g., 101) configured to calculate a fee to be paid by the occupant of the following vehicle for the electronic towing according to the travel plan, and if the travel plan has been recreated by the creating unit, the calculating unit recalculates the fee.

Accordingly, it is possible to calculate a more appropriate fee in consideration of a stop-over that is not originally planned.

In an electronic towing system according to an eleventh aspect, if the travel plan has been recreated by the creating unit, the calculating unit calculates a fee that is lower than a fee of an original travel plan.

Accordingly, it is possible to set a fair fee by reducing the electronic towing fee paid by the following vehicle side to the leading vehicle side because a burden on the following vehicle increases when the leading vehicle side desires to make a stop-over.

In an electronic towing system according to a twelfth aspect, the waypoint includes at least any of a rest area, a convenience store, and a filling station.

Accordingly, it is possible to handle urgent and unscheduled stop-overs for restrooms, motion sickness, and gas refueling.

In an electronic towing system according to a thirteenth aspect, the first information processing apparatus is a communication apparatus (e.g., 30) in possession of the occupant of the leading vehicle or an on-board apparatus (e.g., 207) provided in the leading vehicle, and the second information processing apparatus is a communication apparatus (e.g., 31) in possession of the occupant of the following vehicle or an on-board apparatus (e.g., 217) provided in the following vehicle.

Accordingly, the occupants can easily make an unscheduled stop-over based on a stop-over request, using various apparatuses that can be used by the occupants.

A route planning apparatus according to a fourteenth aspect is a route planning apparatus (e.g., 10) configured to create a travel plan that includes a planned travel route for a leading vehicle (e.g., 20) to electronically tow a following vehicle (e.g., 21) using inter-vehicle communication (e.g., 50), the route planning apparatus including:

a receiving unit (e.g., 101, 103) configured to receive a request to stop at a waypoint during traveling by the electronic towing, the stop-over request being input on a second information processing apparatus (e.g., 31, 217) that is used by an occupant of the following vehicle;

a searching unit (e.g., 101) configured to search, for a waypoint according to the request, the planned travel route and a surrounding region of the planned travel route; and a transmitting unit (e.g., 101, 103) configured to transmit information regarding a found waypoint and a route to the waypoint to a first information processing apparatus (e.g., 30, 207) that is used by an occupant of the leading vehicle.

Accordingly, it is possible to easily inform the occupant of the leading vehicle that the occupant of the following vehicle wants to make a stop-over that is not included in the original travel plan, using the request made by the occupant of the following vehicle while the leading vehicle electronically tows the following vehicle.

A route planning apparatus according to a fifteenth aspect is a route planning apparatus (e.g., 10) configured to create a travel plan that includes a planned travel route for a leading vehicle (e.g., 20) to electronically tow a following vehicle (e.g., 21) using inter-vehicle communication (e.g., 50), the route planning apparatus including:

a receiving unit (e.g., 101, 103) configured to receive a request to stop at a waypoint during traveling by the electronic towing, the stop-over request being input on a first information processing apparatus (e.g., 30, 207) that is used by an occupant of the leading vehicle;

a searching unit (e.g., 101) configured to search, for a waypoint according to the request, the planned travel route and a surrounding region of the planned travel route; and a transmitting unit (e.g., 101, 103) configured to transmit information regarding a found waypoint and a route to the waypoint to a second information processing apparatus (e.g., 31, 217) that is used by an occupant of the following vehicle.

Accordingly, it is possible to easily inform the occupant of the following vehicle that the occupant of the leading vehicle wants to make a stop-over that is not included in the original travel plan, using the request made by the occupant of the leading vehicle while the leading vehicle electronically tows the following vehicle.

A method for controlling a route planning apparatus according to a sixteenth aspect is a method for controlling a route planning apparatus (e.g., 10) configured to create a travel plan that includes a planned travel route for a leading vehicle (e.g., 20) to electronically tow a following vehicle (e.g., 21) using inter-vehicle communication (e.g., 50), the method including:

a receiving step (e.g., F402) of receiving a request to stop at a waypoint during traveling by the electronic towing, the stop-over request being input on a second information processing apparatus (e.g., 31, 217) that is used by an occupant of the following vehicle;

a searching step (e.g., F403) of searching, for a waypoint according to the request, the planned travel route and a surrounding region of the planned travel route; and a transmitting step (e.g., F410) of transmitting information regarding a found waypoint and a route to the waypoint to a first information processing apparatus (e.g., 30, 207) that is used by an occupant of the leading vehicle.

Accordingly, it is possible to easily inform the occupant of the leading vehicle that the occupant of the following vehicle wants to make a stop-over that is not included in the original travel plan, using a request made by the occupant of the following vehicle while the leading vehicle electronically tows the following vehicle.

A method for controlling a route planning apparatus according to a seventeenth aspect is a method for controlling a route planning apparatus (e.g., 10) configured to create a travel plan that includes a planned travel route for a leading vehicle (e.g., 20) to electronically tow a following vehicle (e.g., 21) using inter-vehicle communication (e.g., 50), the method including:

a receiving step (e.g., F602) of receiving a request to stop at a waypoint during traveling by the electronic towing, the stop-over request being input on a first information processing apparatus (e.g., 30, 207) that is used by an occupant of the leading vehicle;

a searching step (e.g., F603) of searching, for a waypoint according to the request, the planned travel route and a surrounding region of the planned travel route; and a transmitting step (e.g., F610) of transmitting information regarding a found waypoint and a route to the waypoint to a second information processing apparatus (e.g., 31, 217) that is used by an occupant of the following vehicle.

Accordingly, it is possible to easily inform the occupant of the following vehicle that the occupant of the leading vehicle wants to make a stop-over that is not included in the original travel plan, using the request made by the occupant of the leading vehicle while the leading vehicle electronically tows the following vehicle.

A program according to an eighteenth aspect is a program for executing each step of the control method according to the sixteenth or seventeenth aspect.

Accordingly, the method for controlling a route planning apparatus can be realized by a computer.

What is claimed is:

1. An electronic towing system in which a leading vehicle electronically tows a following vehicle using inter-vehicle communication, the electronic towing system comprising:

a first information processing apparatus that is used by an occupant of the leading vehicle;

a second information processing apparatus that is used by an occupant of the following vehicle; and a route planning apparatus configured to create a travel plan that includes a planned travel route in which the electronic towing is performed;

wherein the second information processing apparatus includes:

one or more memories storing instructions; and one or more processors executing the instructions to:

accept an input for making a request to stop at a waypoint during traveling by the electronic towing and an input for designating a stay time at the waypoint, and transmit the request to the route planning apparatus, and generate a target travel locus following a travel locus of the leading vehicle and actuate the following vehicle to follow the generated target travel locus, the route planning apparatus includes:

one or more memories storing instructions; and one or more processors executing the instructions to:

create the travel plan, calculate a fee to be paid by the occupant of the following vehicle for the electronic towing according to the travel plan, search, for a waypoint according to the request, the planned travel route and a surrounding region of the planned travel route, recreate the travel plan based on the information regarding the waypoint and the route to the waypoint and information regarding the stay time, recalculate the same amount of fee as that of the original travel plan, if the travel plan has been recreated and a travel time obtained after the recreation of the travel plan is in a predetermined range from a travel time obtained before the recreation of the travel plan, transmit information regarding a found waypoint and a route to the waypoint to the first information processing apparatus, and the first information processing apparatus includes one or more memories storing instructions; and one or more processors executing the instructions to:

notify, of the occupant of the leading vehicle, information regarding the waypoint and the route to the waypoint that has been received from the route planning apparatus.

2. The electronic towing system according to claim 1, wherein the one or more processors of the second information processing apparatus execute the instructions to accept an input for designating a genre of the waypoint, and the one or more processors of the route planning apparatus execute the instructions to search for a waypoint belonging to the genre.

3. The electronic towing system according to claim 1, wherein, if the travel plan has been recreated and a travel time obtained after the recreation of the travel plan is not in a predetermined range from a travel time obtained before the recreation of the travel plan, the one or more processors of the route planning apparatus execute the instructions to calculate a fee that is higher than a fee of an original travel plan.

4. The electronic towing system according to claim 1, wherein the one or more processors of the route planning apparatus execute the instructions to transmit information regarding the found waypoint and the route to the waypoint to the second information processing apparatus, and the one or more processors of the second information processing apparatus execute the instructions to further accept an input of permission or non-permission to make a stop-over, for the information regarding the found waypoint and the route to the waypoint that has been received from the route planning apparatus.

5. The electronic towing system according to claim 4, wherein the one or more processors of the second information processing apparatus execute the instructions to further transmit information indicating the permission or the non-permission to the route planning apparatus, and
if the information indicating the permission or the non-permission is permission, the one or more processors of the route planning apparatus execute the instructions to transmit the information regarding the found waypoint and the route to the waypoint to the first information processing apparatus.

6. The electronic towing system according to claim 1, wherein the waypoint includes at least any of a rest area, a convenience store, and a filling station.

7. The electronic towing system according to claim 1, wherein the first information processing apparatus is a communication apparatus in possession of the occupant of the leading vehicle or an on-board apparatus provided in the leading vehicle, and
the second information processing apparatus is a communication apparatus in possession of the occupant of the following vehicle or an on-board apparatus provided in the following vehicle.

8. An electronic towing system in which a leading vehicle electronically tows a following vehicle using inter-vehicle communication, the electronic towing system comprising:
a first information processing apparatus that is used by an occupant of the leading vehicle;
a second information processing apparatus that is used by an occupant of the following vehicle; and
a route planning apparatus configured to create a travel plan that includes a planned travel route in which the electronic towing is performed;
wherein the first information processing apparatus includes:
one or more memories storing instructions; and
one or more processors executing the instructions to:
accept an input for making a request to stop at a waypoint during traveling by the electronic towing, and
transmit the request to the route planning apparatus,
the route planning apparatus includes:
one or more memories storing instructions; and
one or more processors executing the instructions to:
create the travel plan,
calculate a fee to be paid by the occupant of the following vehicle for the electronic towing according to the travel plan,
search, for a waypoint according to the request, the planned travel route and a surrounding region of the planned travel route,
recreate the travel plan based on the information regarding the waypoint and the route to the waypoint,
recalculate a fee that is lower than a fee of an original travel plan if the travel plan has been recreated, and
transmit information regarding a found waypoint and a route to the waypoint to the second information processing apparatus, and the second information processing apparatus includes
one or more memories storing instructions; and
one or more processors executing the instructions to:
notify, of the occupant of the following vehicle, information regarding the waypoint and the route to the waypoint that has been received from the route planning apparatus, and
generate a target travel locus following a travel locus of the leading vehicle and actuate the following vehicle to follow the generated target travel locus.

9. A method for controlling a route planning apparatus configured to create a travel plan that includes a planned travel route for a leading vehicle to electronically tow a following vehicle using inter-vehicle communication, the method comprising:
creating the travel plan;
calculating a fee to be paid by the occupant of the following vehicle for the electronic towing according to the travel plan;
receiving a request to stop at a waypoint during traveling by the electronic towing and a stay time at the waypoint, the stop-over request and the stay time being input on a second information processing apparatus that is used by an occupant of the following vehicle;
searching, for a waypoint according to the request, the planned travel route and a surrounding region of the planned travel route;
recreating the travel plan based on the information regarding the waypoint and the route to the waypoint and information regarding the stay time;
recalculating the same amount of fee as that of the original travel plan, if the travel plan has been recreated and a travel time obtained after the recreation of the travel plan is in a predetermined range from a travel time obtained before the recreation of the travel plan;
transmitting information regarding a found waypoint and a route to the waypoint to a first information processing apparatus that is used by an occupant of the leading vehicle; and
by the second information processing apparatus, generating a target travel locus following a travel locus of the leading vehicle and actuating the following vehicle to follow the generated target travel locus.

10. A method for controlling a route planning apparatus configured to create a travel plan that includes a planned travel route for a leading vehicle to electronically tow a following vehicle using inter-vehicle communication, the method comprising:
creating the travel plan;
calculating a fee to be paid by the occupant of the following vehicle for the electronic towing according to the travel plan;
receiving a request to stop at a waypoint during traveling by the electronic towing, the stop-over request being input on a first information processing apparatus that is used by an occupant of the leading vehicle;
searching, for a waypoint according to the request, the planned travel route and a surrounding region of the planned travel route;
recreating the travel plan based on the information regarding the waypoint and the route to the waypoint;
recalculating a fee that is lower than a fee of an original travel plan if the travel plan has been recreated;
transmitting information regarding a found waypoint and a route to the waypoint to a second information processing apparatus that is used by an occupant of the following vehicle; and by the second information processing apparatus, generating a target travel locus following a travel locus of the leading vehicle and actuating the following vehicle to follow the generated target travel locus.

11. An electronic towing system in which a leading vehicle electronically tows a following vehicle using inter-vehicle communication, the electronic towing system comprising:
- a first information processing apparatus that is used by an occupant of the leading vehicle;
- a second information processing apparatus that is used by an occupant of the following vehicle; and
- a route planning apparatus configured to create a travel plan that includes a planned travel route in which the electronic towing is performed;
- wherein the first information processing apparatus includes:
- one or more memories storing instructions; and
- one or more processors executing the instructions to:
  - accept an input for making a request to stop at a waypoint during traveling by the electronic towing and an input for designating a stay time at the waypoint, and
  - transmit the request to the route planning apparatus,
- the route planning apparatus includes:
- one or more memories storing instructions; and
- one or more processors executing the instructions to:
  - create the travel plan,
  - calculate a fee to be paid by the occupant of the following vehicle for the electronic towing according to the travel plan,
  - search, for a waypoint according to the request, the planned travel route and a surrounding region of the planned travel route,
  - recreate the travel plan based on the information regarding the waypoint and the route to the waypoint and information regarding the stay time,
  - recalculate the same amount of fee as that of the original travel plan, if the travel plan has been recreated and a travel time obtained after the recreation of the travel plan is in a predetermined range from a travel time obtained before the recreation of the travel plan,
  - transmit information regarding a found waypoint and a route to the waypoint to the second information processing apparatus, and
- the second information processing apparatus includes
- one or more memories storing instructions; and
- one or more processors executing the instructions to:
  - notify, of the occupant of the following vehicle, information regarding the waypoint and the route to the waypoint that has been received from the route planning apparatus, and
  - generate a target travel locus following a travel locus of the leading vehicle and actuate the following vehicle to follow the generated target travel locus.

* * * * *